March 1, 1960 G. T. McCLURE 2,926,967
FLUID PRESSURE OPERATED CONTROL VALVE DEVICE
Filed Aug. 31, 1956
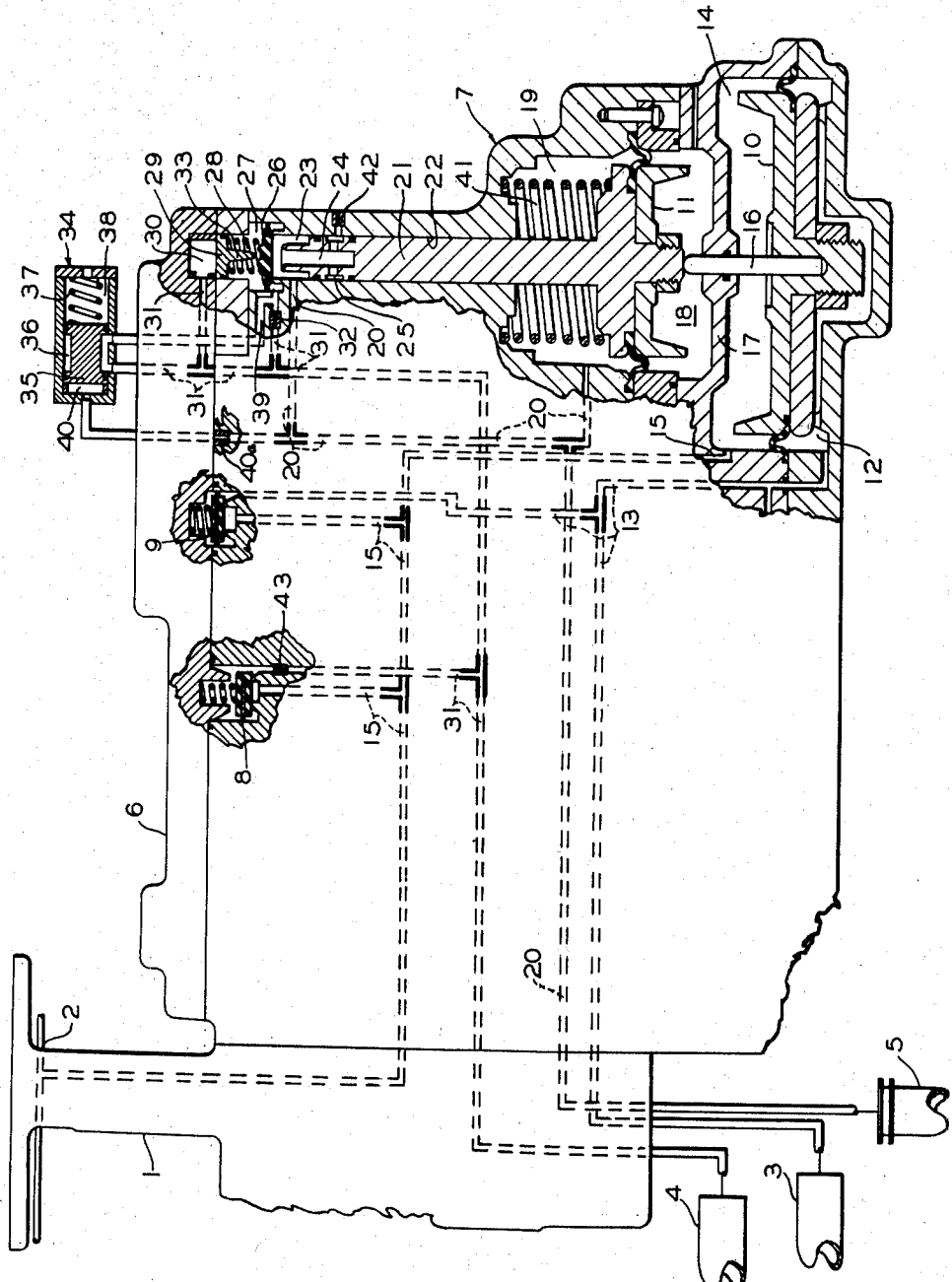
INVENTOR.
Glenn T. McClure
BY
Adelbert A. Steinmiller
ATTORNEY

2,926,967
FLUID PRESSURE OPERATED CONTROL VALVE DEVICE

Glenn T. McClure, McKeesport, Pa., assignor to Westinghouse Air Brake Company, Wilmerding, Pa., a corporation of Pennsylvania Application August 31, 1956, Serial No. 607,340

7 Claims. (Cl. 303—60)

This invention relates to fluid pressure brake apparatus embodying a self-lapping type service valve device for controlling the degree of application and release of brakes on a railway car or the like according to the extent of reduction and restoration, respectively, of fluid pressure in a brake pipe relative to a constant fluid pressure in a control reservoir; the invention relating more particularly to an apparatus of said type embodying an improved arrangement for eliminating the lag heretofore experienced in development of a brake cylinder pressure proportionate to the operator-effected reduction in brake pipe pressure and thereby obtaining a more prompt brake cylinder pressure build-up than heretofore achieved during a service brake application, while at the same time assuring that brake cylinder pressure may be increased in successive small increments or stages.

It has heretofore been customary, in apparatus of the above type, to interpose the brake cylinder application choke (which controls build-up rate of brake cylinder pressure) in a delivery passage leading from the usual poppet-type brake cylinder supply valve of the service valve device to the brake cylinder. With this arrangement, since the service valve device tends to move to lap position and hunt a position in which the rate of flow past the supply valve is equal to the rate of flow through the application choke, the pressure differential across the application choke will be less than is full auxiliary reservoir pressure were constantly available at the high pressure side of said choke; and as a result of this lesser pressure differential, there is an undesirable delay or lag in attainment in the brake cylinder of a pressure proportional to the operator-effected reduction in brake pipe pressure.

It is therefore an object of this invention to relocate the application choke by interposing it in the supply passage leading from the auxiliary reservoir to the supply valve. With this arrangement, the brake cylinder chamber of the service valve device will be in constant substantially unrestricted communication with the brake cylinder and thereby truly reflect existing brake cylinder pressure. Also, by thus relocating the brake cylinder application choke, the brake cylinder chamber of the service valve device will be somewhat "starved," thereby assuring that the supply valve will be maintained fully open until a pressure is established in said chamber and hence in the brake cylinder corresponding to the operator-effected reduction in brake pipe pressure.

With this arrangement, however, since supply of auxiliary reservoir air to the supply valve is at the restricted rate controlled by the application choke, whereas flow from the supply valve to the brake cylinder is at a substantially unrestricted rate, the supply valve will become substantially unloaded as soon as it is unseated. When the service valve device moves to lap position, in which the supply valve is reseated, auxiliary reservoir fluid will flow via and at the rate controlled by the application choke to the supply valve chamber, with the result that a further degree of application of brakes can be made only by reducing brake pipe pressure sufficiently to overcome the bias exerted on the supply valve by auxiliary reservoir pressure which has in the meantime fed into said supply valve chamber; this, in turn, will make it impossible to effect increases in brake cylinder pressure in very small stages, as will be understood from subsequent description. In other words, the bias exerted by auxiliary reservoir pressure on the supply valve disappears when said valve is unseated and undesirably reappears (by build-up of auxiliary reservoir pressure through the application choke) after said valve is reseated.

It is therefore an object of the invention to provide, in a brake apparatus of the above general type and having a brake cylinder application choke located in the supply passage to the brake cylinder supply valve (rather than in the delivery passage from the latter valve), means for maintaining a constant bias or load on the supply valve and hence on the service valve device from the time the supply valve seats during a service application until it is unseated to effect a brake application of a greater degree. With this constant load arrangement, the balance of the self-lapping type service valve device will be upset upon a slight further reduction in brake pipe pressure during a service application of brakes and thereby permit brake cylinder pressure to be increased in very small increments.

According to the invention, the brake cylinder application choke is interposed in the supply passage from the auxiliary reservoir to the supply chamber containing the supply valve, and a movable abutment is provided which is subject to one side to pressure of fluid in said supply chamber and to pressure of a bias spring that bears on said supply valve to bias the latter to its seat; said movable abutment being subject at the opposite side to fluid pressure in a chamber having unrestricted communication with the auxiliary reservoir.

With this improved arrangement, when the supply valve is unseated in consequence of movement of the service valve device to brake application position, pressure in the supply chamber will promptly equalize into the brake cylinder due to the starved rate of supply through the application choke; and as a result of this unbalance in fluid pressures across the movable abutment, said movable abutment will impose on the service valve, through the medium of the supply valve, a fluid pressure force which will be effective in helping shift the service valve device to its lap position. Although the magnitude of this force will vary while the supply valve is unseated, due to changes in auxiliary reservoir pressure and brake cylinder pressure, this force will remain constant at its then existing value from the moment the supply valve seats; and hence upon any subsequent slight reduction in brake pipe pressure, the balance of the self-lapping type service valve device will be immediately destroyed and the supply valve promptly unseated.

Other objects and advantages will become apparent from the following more detailed description of the invention and from the accompanying drawing, wherein the single figure is a diagrammatic view of a brake apparatus embodying the invention.

Description

As shown in the drawing, the brake controlling valve device embodying the invention may comprise a pipe bracket 1, to which are connected the usual brake pipe 2, a control reservoir 3, an auxiliary reservoir 4, and a brake cylinder 5. On one face of the bracket 1 is mounted a sectionalized casing 6 containing a service valve device 7, an auxiliary reservoir charging check valve 8 and a control reservoir charging check valve 9; said service valve device differing from corresponding valve devices heretofore proposed according to features of the invention hereinafter to be described.

The service valve device 7 may comprise two coaxially arranged, spaced-apart movable abutments 10 and 11 of different effective areas and cooperably, though not positively, connected to each other so as to form a stack, as will be understood from subsequent description. The larger movable abutment 10 is subject at its under side, as viewed in the drawing, to pressure of fluid in a chamber 12 constantly open to the control reservoir 3 via a passage 13; and said movable abutment 10 is subject at the opposite side to pressure of fluid in a chamber 14 constantly open to the brake pipe 2 via a passage 15.

The movable abutment 10 is cooperably connected to the smaller movable abutment 11 through the medium of a coaxially arranged, cylindrical pusher stem 16 having sealing, slidably guided engagement with the wall of an aligned bore through a casing partition 17 separating chamber 14 from an atmospheric chamber 18 at one side of movable abutment 11; said stem at its respective ends engaging the movable abutments 10 and 11. At the opposite side of movable abutment 11 is a chamber 19 that, according to a feature of the invention, has constant unrestricted communication with the brake cylinder 5 by way of a brake cylinder passage 20.

The movable abutment 11 is positively connected to a coaxially arranged, cylindrical service valve 21 having sealing, slidably guided engagement with the wall of an aligned bore 22 open to chamber 19. Adjacent its unconnected end, the service valve 21 is of reduced diameter so as to define, in cooperation with the surrounding bore 22, an annular chamber 23 constantly open to a branch of brake cylinder passage 20. Extending inwardly from this unconnected end of valve 21 is an axially arranged, bore-like opening 24 constantly open via suitable radial apertures to an elongated annular cavity 25 formed in said valve intermediate its ends. Arranged coaxially with the service valve 21 is a preferably disc-shaped brake cylinder supply valve 26 which is contained in a chamber 27. Valve 26 controls fluid flow between the chambers 27 and 23 and is biased by a helical spring 28 in chamber 27 into seating contact with an annular valve seat rib encircling one end of bore 22.

According to features of the invention: a movable abutment, such as a piston 29, is arranged coaxially with the supply valve 26 and is slidably mounted in a bore separating chamber 27 from a chamber 30 having unrestricted communication with the auxiliary reservoir 4 via a passage 31; the chamber 27 is constantly open to a branch of passage 31 via a brake cylinder application choke 32; the piston 29 has a coaxially arranged stem 33 which projects through chamber 27 toward the supply valve 26; and spring 28 is interposed between the piston 29 and valve 26 for biasing valve 26 into contact with its seat while at the same time holding the stem disengaged from said valve 26 so long as pressure in chamber 27 is substantially equal to auxiliary reservoir pressure as noted in chamber 30.

If it is desired to include an inshot valve device in the improved apparatus, such a valve device may, for sake of illustration, be of the type shown in the drawing and designated by the reference numeral 34. This valve device 34 comprises a shuttle valve 35 having an elongated annular cavity 36 intermediate its ends and biased by a helical regulating spring 37 in an atmospheric chamber 38 to a normal or open position, in which cavity 36 connects a branch of auxiliary reservoir passage 31 with a passage 39 leading to chamber 27 in by-pass of the brake cylinder application choke 32. The valve 35 is subject, in opposition to pressure of spring 37, to brake cylinder pressure as noted in a chamber 40 constantly open via a baffle choke 40a to a branch of brake cylinder passage 20; and when brake cylinder pressure in said chamber exceeds a chosen value, such as about 10 p.s.i., as determined by the selected value of spring 37, the valve 35 will be shifted to a closed position, in which passage 31 is disconnected from passage 39, with the result that fluid under pressure will thereupon be supplied to the chamber 27 solely via and at the rate controlled by the brake cylinder application choke 32.

In operation, assume initially that the apparatus is devoid of fluid under pressure. Under this condition, a helical spring 41 in chamber 19 of service valve device 7 will act on movable abutment 11 and, through the medium of stem 16, on movable abutment 10 for urging the stack to the position in which it is shown in the drawing, which position may be defined by contact of movable abutment 10 with a suitable stop formed in the end wall of chamber 12, for thereby defining a brake release position of the service valve 21. With valve 21 in this position, the end of said valve is disengaged from the supply valve 26, and cavity 25 is in registry with a brake cylinder release choke 42. Hence, the brake cylinder 5 is open to atmosphere via passage 20, chamber 23, opening 24, cavity 25, and choke 42; and valve 26 is held seated by spring 28, which spring also is effective to maintain the stem 33 of piston 29 disengaged from valve 26. Also, with the apparatus devoid of fluid under pressure, the inshot valve 35 will be maintained in its open position, in which it is shown, by pressure of spring 37.

To initially charge the apparatus, fluid under pressure is supplied to the brake pipe 2 at the locomotive in the well-known manner. On a particular car, some of this fluid will flow via a branch of brake pipe passage 15 to chamber 14 of service valve device 7 for maintaining the service valve 21 in its brake release position; some of such fluid will flow via another branch of passage 15 to the under side of auxiliary reservoir charging check valve 8, unseating said check valve, and then flowing therepast and at the rate controlled by a charging choke 43 to a branch of auxiliary reservoir passage 31 for charging the auxiliary reservoir 4; and some of such fluid will flow via still another branch of brake pipe passage 15 to the under side of control reservoir charging check valve 9, unseating said check valve and flowing therepast to a branch of control reservoir passage 13, for charging the control reservoir 3 and also chamber 12 of service valve device 7.

To effect an application of brakes, pressure of fluid in the brake pipe 2 is reduced at the locomotive in the well-known manner. When, on a particular car, brake pipe pressure as noted in chamber 14 of service valve device 7 has been reduced a preselected degree, such as about 3 p.s.i., below control reservoir pressure in chamber 12, movable abutment 10 will be shifted upwardly and, through the medium of stem 16, shift movable abutment 11 and thereby the service valve 21 to a brake application position against the combined resistance afforded by pressures of springs 41 and 28 and auxiliary reservoir pressure in chamber 27 acting on supply valve 26. During movement of service valve 21 to brake application position, the end of said valve will successively abut and then unseat the supply valve 26 for permitting auxiliary reservoir fluid to flow via passage 31 and cavity 36 of inshot valve 35 in open position to passage 39 and thence, in by-pass of choke 32, past the then unseated supply valve 26 to passage 20, branches of which lead to the brake cylinder 5 and to chamber 19 of service valve device 7.

So long as the inshot valve 35 remains in normal position, the piston 29 will tend to remain in the position in which it is shown because pressure in chamber 27 will be substantially equal to the pressure in chamber 30 due to the unrestricted supply from the auxiliary reservoir to chamber 27 in by-pass of choke 32. When, however, brake cylinder pressure exceeds the illustrative 10 p.s.i., and the inshot valve 35 is thereby shifted to closed position, pressures in chambers 27 and 23 will drop below auxiliary reservoir pressure as noted in chamber 30 because chambers 27 and 23 are on the downstream side of the choke 32 and are in unrestricted communication with the brake cylinder 5, which initially at least is at a considerably lower pressure.

When pressure in chamber 27 thus becomes reduced below auxiliary reservoir pressure due to this restricted flow through choke 32, piston 29 will be shifted against resistance of spring 28 and, through the medium of piston stem 33, impose a bias force on supply valve 26 (which is then held unseated by the service valve 21) and thereby impose such bias force on said service valve. So long as valve 26 is unseated, auxiliary reservoir pressure, as noted in chamber 30, will be reducing due to flow of auxiliray reservoir air to the brake cylinder 5; and brake cylinder pressure, as noted in chambers 27 and 23, will increase. This bias force is equal to the net or differential fluid pressure acting over the effective area of the piston 29, which effective area is preferably equal to the effective area of the supply valve 26.

Meanwhile, fluid under pressure will continue to flow from the auxiliary reservoir 4 via choke 32 and past the unseated supply valve 26 to the brake cylinder 5. The effective area of movable abutment 10 is preferably about 2.9 times the effective area of movable abutment 11 so that for each 1 p.s.i. that brake pipe pressure as noted in chamber 14 is reduced below control reservoir pressure as noted in chamber 12 (after the initial bias equivalent to about 3 p.s.i. of brake pipe pressure is overcome), brake cylinder pressure as noted in chamber 19 will be increased 2.9 p.s.i. When the combined effect of brake cylinder pressure, as noted in chamber 19, auxiliary reservoir pressure in chamber 30, pressures of springs 28 and 41, and brake pipe pressure in chamber 14 slightly overcome the opposing effect on the service stack of control reservoir pressure in chamber 12, the service valve 21 will be shifted downwardly to a lap position, in which supply valve 26 is seated by spring 28 and the unconnected end of service valve 21 sealingly engages the supply valve for preventing flow of fluid under pressure from the brake cylinder passage 20 to atmosphere via the release choke 42. Fluid will thus be bottled up in the brake cylinder 5 at a pressure which is 2.9 times the net (after deduction of the aforementioned 3 p.s.i. bias) operator-effected reduction in brake pipe pressure.

With the service valve 21 in lap position, as soon as the supply valve 26 seats, the effect on the service stack of fluid pressure in chamber 27 acting on supply valve 26 will be offset by the opposing effect of fluid pressure in chamber 27 acting on the piston 29 (which as already stated is of the same effective area as the supply valve); and hence the effective bias force imposed at the movement of closure of the supply valve 26 will be equal to existing auxiliary reservoir pressure in chamber 30 acting on piston 29. After valve 26 seats, pressure in chamber 27 will promptly equalize with auxiliary reservoir pressure via choke 32 and hence directly impose the fluid pressure bias or load on the supply valve 26; and the indirect bias initially imposed by auxiliary reservoir pressure in chamber 30, the piston 29 and stem 33 will be relieved because, as pressures in chambers 27 and 30 near equalization, piston 29 will exert no bias on valve 26 and spring 28 will shift said piston upward for carrying the stem 33 out of contact with valve 26.

It will thus be seen that, from the moment the service valve 21 moves to lap position, the fluid pressure bias or load on the supply valve 26 and hence on the service stack will be maintained constant. Hence, if brake pipe pressure should now be reduced very slightly for effecting an increase in the degree of brake application, the service stack will immediately become unbalanced and the service valve 21 will be promptly shifted to application position; whereupon the apparatus will operate to effect a corresponding increase in brake cylinder pressure, as will be understood from previous description.

Since the bias imposed on the supply valve 26 is thus maintained constant after the service valve 21 moves to its previously defined lap position and until the supply valve 26 is subsequently moved to application position, it will thus be seen that brake cylinder pressure may be increased in small steps or stages responsively to successive slight reductions in brake pipe pressure.

To effect a release of brakes, brake pipe pressure is increased at the locomotive in the well-known manner. On a particular car, this increase in brake pipe pressure as noted in chamber 14 will cause the service stack to shift the service valve 21 to its brake release position, in which it is shown, and in which fluid under pressure will be released from the brake cylinder 5 a degree corresponding to the degree of increase in brake pipe pressure. Thus, if brake pipe pressure is partially restored, the service valve 21 will be shifted to lap position when brake cylinder pressure in chamber 19 has been reduced a degree corresponding to the operator-effected increase in brake pipe pressure; whereas, if brake pipe pressure is fully restored, the service valve 21 will be maintained in brake release position for completely venting the brake cylinder 5.

Having now described the invention, what I claim as new and desire to secure by Letters Patent, is:

1. A fluid pressure brake apparatus comprising a normally charged brake pipe, an auxiliary reservoir, a brake cylinder, normally seated brake cylinder supply valve means subject opposingly to brake cylinder pressure and to fluid pressure in a chamber, brake cylinder application choke means interposed between the chamber and auxiliary reservoir, service valve means normally connecting the brake cylinder to atmosphere and responsive to a reduction in brake pipe pressure below normal charge value to operatively unseat said supply valve means for permitting fluid under pressure to flow from said auxiliary reservoir via said choke means and chamber to the brake cylinder, and movable abutment means subject opposingly to fluid pressure in the chamber and to pressure of fluid in another chamber always open without restriction to said auxiliary reservoir for operatively imposing a load on said supply valve means and thereby on said service valve means whenever and so long as pressure in the first-mentioned chamber is less than the pressure in said other chamber.

2. A fluid pressure brake apparatus comprising a normally charge brake pipe, an auxiliary reservoir, a brake cylinder, normally seated brake cylinder supply valve means subject opposingly to brake cylinder pressure and to fluid pressure in a chamber, a restricted communication by way of which the chamber is always open to the auxiliary reservoir, service valve means normally in a release position for connecting the brake cylinder to atmosphere and operative to an application position responsively to a reduction in brake pipe pressure below normal charge value to operatively unseat said supply valve means for permitting fluid under pressure to flow from said auxiliary reservoir via and at the rate controlled by said restricted communication to the brake cylinder, movable abutment means subject opposingly to fluid pressure in the chamber and to pressure of fluid in another chamber always having unrestricted communication with said auxiliary reservoir for operatively imposing a load on said supply valve means and thereby on said service valve means tending to bias said service valve means from application position toward release position when pressure in the first-mentioned chamber is less than the pressure in said other chamber, and resilient means biasing said supply valve means to a seated position.

3. The combination, with a normally charged brake pipe, an auxiliary reservoir and a brake cylinder, of a service valve device comprising normally seated brake cylinder supply valve means subject opposingly to brake cylinder pressure and to fluid pressure in a chamber, brake cylinder application choke means interposed between the chamber and auxiliary reservoir, service valve means, and two coaxially arranged movable abutments of different effective areas arranged in a stack for controlling positioning of said service valve means, the larger movable abutment being subject to brake pipe pressure and an opposing constant pressure corresponding to the normal charge value of brake pipe pressure, and the smaller movable abutment being subject to brake cylinder pressure and pressure of a spring bias, said service valve means normally connecting the brake cylinder to atmosphere and being responsive to a reduction in brake pipe pressure relative to said constant pressure to operatively unseat said supply valve means for supplying fluid under pressure from said auxiliary reservoir to said brake cylinder via said choke means and chamber until brake cylinder pressure attains a value proportionate to the degree of such reduction in brake pipe pressure and causes the stack to shift the service valve means to a lap position in which said supply valve means is seated and the brake cylinder is cut off from atmosphere, and movable abutment means subject opposingly to fluid pressure in the chamber and to pressure of fluid in another chamber always having substantially unrestricted connection with the auxiliary reservoir for operatively imposing a load on the supply valve means and thereby on said service valve means tending to bias said service valve means to its lap position only when pressure in the first-mentioned chamber is less than the pressure in said other chamber.

4. A fluid pressure brake apparatus comprising a normally charged brake pipe, an auxiliary reservoir, a brake cylinder, normally seated brake cylinder supply valve means subject opposingly to brake cylinder pressure and to fluid pressure in a chamber, brake cylinder application choke means interposed between the chamber and auxiliary reservoir, service valve means normally connecting the brake cylinder to atmosphere and responsive to a reduction in brake pipe pressure below normal charge value to operatively unseat said supply valve means for permitting fluid under pressure to flow from said auxiliary reservoir via said choke means and chamber to the brake cylinder, movable abutment means of substantially the same effective area as that of said supply valve means, said movable abutment means being subject opposingly to pressure of fluid in said chamber and to pressure of fluid in another chamber always open substantially without restriction to the auxiliary reservoir for operatively imposing a load on said supply valve means and thereby on said service valve means tending to bias said service valve means from application position toward release position when pressure in the first-mentioned chamber is less than the pressure in said other chamber, and inshot valve means for connecting said auxiliary reservoir to the chamber in by-pass of said choke means so long as brake cylinder pressure is less than a preselected value.

5. The combination, with a normally charged brake pipe, an auxiliary reservoir and a brake cylinder, of a service valve device comprising normally seated brake cylinder supply valve means subject opposingly to brake cylinder pressure and to fluid pressure in a chamber, brake cylinder application choke means interposed between the chamber and auxiliary reservoir, service valve means, and two coaxially arranged movable abutments of different effective areas arranged in a stack for controlling positioning of said service valve means, the larger movable abutment being subject to brake pipe pressure and an opposing constant pressure corresponding to the normal charge value of brake pipe pressure, and the smaller movable abutment being subject to brake cylinder pressure and pressure of a spring bias, said service valve means normally connecting the brake cylinder to atmosphere and being responsive to a reduction in brake pipe pressure relative to said constant pressure to operatively unseat said supply valve means for supplying fluid under pressure from said auxiliary reservoir to said brake cylinder via said choke means and chamber until brake cylinder pressure attains a value proportionate to the degree of such reduction in brake pipe pressure and causes the stack to shift the service valve means to a lap position in which said supply valve means is seated and the brake cylinder is cut off from atmosphere, movable abutment means subject opposingly to fluid pressure in said chamber and to pressure of fluid in another chamber always having substantially unrestricted communication with the auxiliary reservoir for operatively imposing a load on the supply valve means and thereby on said service valve means tending to bias said service valve means to its lap position whenever and so long as pressure in the first-mentioned chamber is less than the pressure in said other chamber, the effective area of said movable abutment means being substantially the same as that of the supply valve means, and inshot valve means operative to connect the auxiliary reservoir to the chamber in by-pass of said choke means when brake cylinder pressure is less than a preselected value and operative to disestablish such by-pass connection when brake cylinder pressure exceeds said preselected value.

6. The combination, with a normally charged brake pipe, an auxiliary reservoir and a brake cylinder, of a service valve device comprising normally seated brake cylinder supply valve means subject opposingly to brake cylinder pressure and to fluid pressure in a chamber, brake cylinder application choke means interposed between the chamber and auxiliary reservoir, service valve means, and two coaxially arranged movable abutments of different diameters for controlling positioning of said service valve means, the larger movable abutment being subject to brake pipe pressure and an opposing constant pressure corresponding to the normal charge value of brake pipe pressure, and the smaller movable abutment being subject to brake cylinder pressure and pressure of a spring bias, said service valve means normally connecting the brake cylinder to atmosphere and being operatively responsive to forces exerted by said movable abutments upon a reduction in brake pipe pressure relative to said constant pressure to operatively unseat said supply valve means for supplying fluid under pressure from said auxiliary reservoir to said brake cylinder via said choke means and chamber until brake cylinder pressure attains a value proportionate to the degree of such reduction in brake pipe pressure and causes said movable abutments to shift the service valve means to a lap position in which said supply valve means is seated and the brake cylinder is cut off from atmosphere, movable abutment means subject opposingly to auxiliary reservoir pressure and fluid pressure in the chamber for operatively imposing a load on the supply valve means and thereby on said service valve means tending to bias said service valve means to its lap position whenever and so long as pressure in said chamber is less than auxiliary reservoir pressure, the effective area of said movable abutment means being substantially the same as that of said supply valve means, and including resilient means interposed between said supply valve means and movable abutment means for biasing said supply valve means to a seated position and also urging said movable abutment means to a position in which it is operatively disengaged from said supply valve means.

7. A brake apparatus of the type comprising a service valve device which is normally biased to a release position for connecting a brake cylinder to atmosphere and permitting closure of a brake cylinder supply valve so as to cut off the brake cylinder from a source of fluid under pressure, characterized in that the brake cylinder supply valve is subject to fluid at the pressure of fluid in the brake cylinder acting in opposition to pressure of fluid in a chamber having restricted communication with the source, and including movable abutment means of the same effective area as the brake cylinder supply valve and subject opposingly to pressure of fluid in said chamber and to pressure of fluid in another chamber having unrestricted communication with the source, such that upon movement of said service valve device to an application position in which the brake cylinder is disconnected from atmosphere and the brake cylinder supply valve is operatively opened for permitting flow of fluid under pressure from the source via the first-mentioned chamber to the brake cylinder, pressure of fluid in said first-mentioned chamber will drop below that in said other chamber and cause said movable abutment means to impose a load on said supply valve and thereby on the service valve device tending to bias the latter to a lap position, intermediate its application and release positions, so long as pressure in said first-mentioned chamber is less than that in said other chamber, the service valve device being operative in lap position to maintain the brake cylinder cut off from atmosphere and permit closure of the supply valve.

References Cited in the file of this patent

UNITED STATES PATENTS

| | | |
|---|---|---|
| 2,249,969 | McKinstry | July 22, 1941 |
| 2,376,680 | Gallusser | May 22, 1945 |
| 2,450,275 | Eaton | Sept. 28, 1948 |
| 2,714,534 | Keller | Aug. 2, 1955 |